(12) United States Patent
Hirano

(10) Patent No.: US 9,853,557 B2
(45) Date of Patent: Dec. 26, 2017

(54) POWER CONVERSION APPARATUS AND POWER CONVERSION METHOD

(71) Applicant: Toyota Jidosha Kabushiki Kaisha, Toyota-shi, Aichi-ken (JP)

(72) Inventor: Takahiro Hirano, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 692 days.

(21) Appl. No.: 14/282,441

(22) Filed: May 20, 2014

(65) Prior Publication Data

US 2014/0346871 A1 Nov. 27, 2014

(30) Foreign Application Priority Data

May 21, 2013 (JP) .................................. 2013-107417

(51) Int. Cl.
*H02J 3/46* (2006.01)
*H02J 1/10* (2006.01)
*H02M 3/335* (2006.01)

(52) U.S. Cl.
CPC ... *H02M 3/33584* (2013.01); *H02M 3/33561* (2013.01); *Y10T 307/352* (2015.04)

(58) Field of Classification Search
CPC .......... H02M 3/33561; H02M 3/33584; Y10T 307/352
USPC ..................................................... 307/24, 66
See application file for complete search history.

(56) References Cited

U.S. PATENT DOCUMENTS

| 2011/0198933 A1* | 8/2011 | Ishigaki | .................. B60R 25/00 307/66 |
| 2011/0249472 A1* | 10/2011 | Jain | .................... H02M 3/33584 363/15 |
| 2014/0313784 A1* | 10/2014 | Strzalkowski | .... H02M 3/33584 363/17 |

FOREIGN PATENT DOCUMENTS

JP 2011-193713 A 9/2011

OTHER PUBLICATIONS

Jun Moto, U.S. Appl. No. 14/282,405, filed May 20, 2014.
Hirano et al., PCT Application No. PCT/IB2014/000769 f. May 20, 2014.

* cited by examiner

*Primary Examiner* — Rexford Barnie
*Assistant Examiner* — Toan Vu
(74) *Attorney, Agent, or Firm* — Dinsmore & Shohl LLP

(57) ABSTRACT

A power conversion apparatus includes a primary side circuit, a secondary side circuit magnetically coupled to the primary side circuit through a transformer, and a control unit that adjusts transmitted power transmitted between the primary side circuit and the secondary side circuit by changing a phase difference between switching of the primary side circuit and switching of the secondary side circuit. The control unit suppresses a fluctuation in the transmitted power by suppressing a change in a duty ratio of the switching of the primary side circuit to the switching of the secondary side circuit.

11 Claims, 8 Drawing Sheets

POWER CONVERSION APPARATUS AND POWER CONVERSION METHOD

INCORPORATION BY REFERENCE

The disclosure of Japanese Patent Application No. 2013-107417 filed on May 21, 2013 including the specification, drawings and abstract is incorporated herein by reference in its entirety.

BACKGROUND OF THE INVENTION

1. Field of the Invention

The invention relates to an apparatus and a method for performing a power conversion between a primary side circuit and a secondary side circuit that is magnetically coupled to the primary side circuit via a transformer.

2. Description of Related Art

A conventional power conversion apparatus can adjust an amount of power transmitted between a primary side circuit and a secondary side circuit by changing a phase difference between switching of the primary side circuit and switching of the secondary side circuit (see Japanese Patent Application Publication No. 2011-193713 (JP 2011-193713 A), for example).

SUMMARY OF THE INVENTION

However, transmitted power transmitted between the primary side circuit and the secondary side circuit may conventionally fail to be accurately adjusted. An object of the invention is to provide a power conversion apparatus and a power conversion method which allow the transmitted power transmitted between the primary side circuit and the secondary side circuit to be accurately adjusted.

A first aspect of the invention is a power conversion apparatus including: a primary side circuit; a secondary side circuit magnetically coupled to the primary side circuit through a transformer; and a control unit that adjusts transmitted power transmitted between the primary side circuit and the secondary side circuit by changing a phase difference between switching of the primary side circuit and switching of the secondary side circuit. The control unit suppresses a fluctuation in the transmitted power by suppressing a change in a duty ratio of the switching of the primary side circuit to the switching of the secondary side circuit.

A second aspect of the invention is a power conversion method for adjusting transmitted power transmitted between a primary side circuit and a secondary side circuit magnetically coupled to the primary side circuit through a transformer, by changing a phase difference between switching of the primary side circuit and switching of the secondary side circuit. A fluctuation in the transmitted power is suppressed by suppressing a change in a duty ratio of the switching of the primary side circuit to the switching of the secondary side circuit.

According to the first and second aspects of the invention, the transmitted power transmitted between the primary side circuit and the secondary side circuit can be accurately adjusted.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
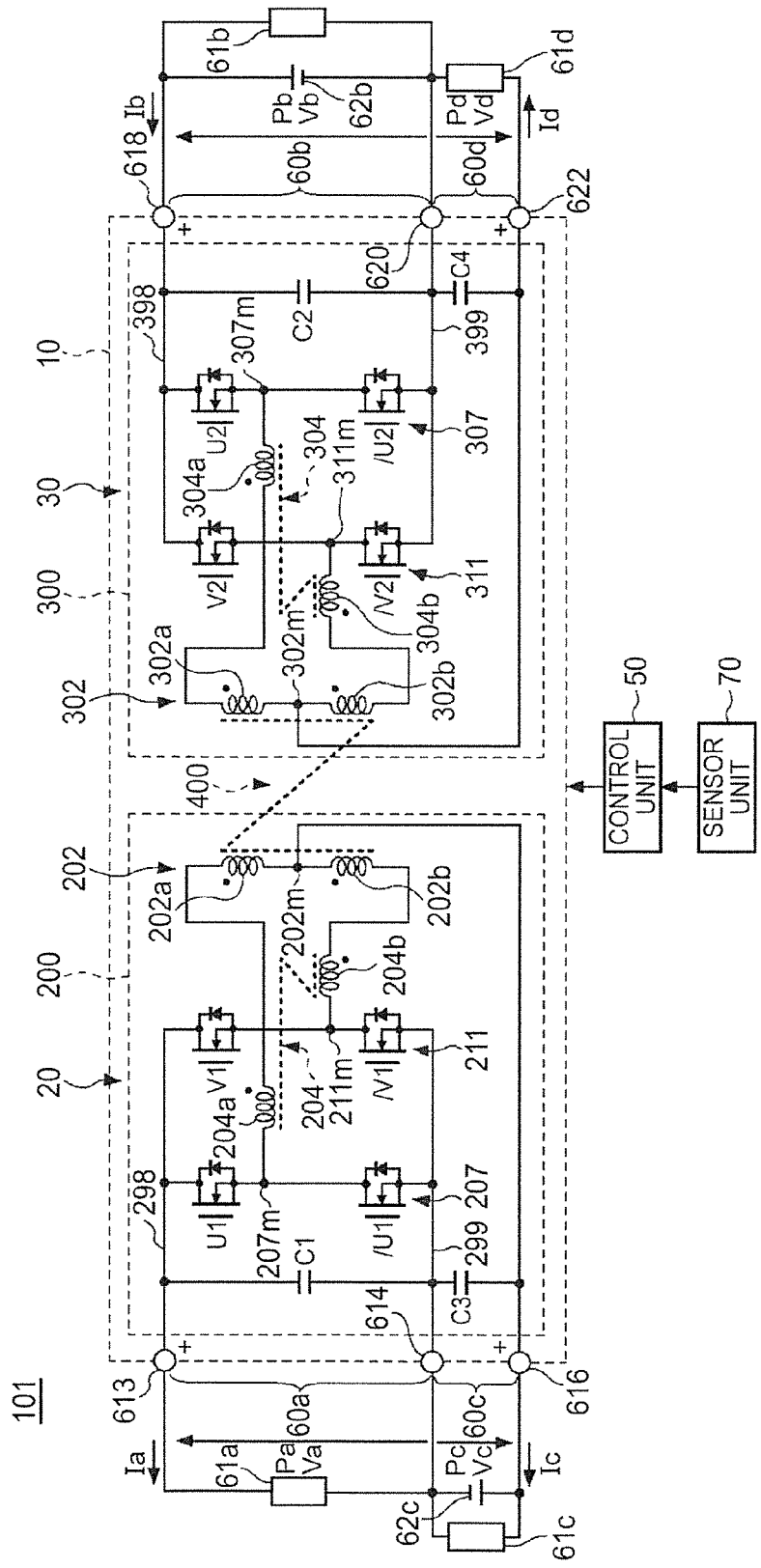
FIG. 1 is a block diagram showing an example of a configuration of a power supply apparatus serving as an embodiment of a power conversion apparatus according to the invention.

FIG. 1 is a block diagram showing an example of a configuration of a power supply apparatus 101 serving as an embodiment of a power conversion apparatus. For example, the power supply apparatus 101 is a power supply system that includes a power supply circuit 10, a control unit 50, and a sensor unit 70.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing power conversion between the two selected input/output ports.

Port powers Pa, Pc, Pb, Pd are input/output powers (input powers or output powers) of the first input/output port 60a, the second input/output port 60c, the third input/output port 60b, and the fourth input/output port 60d, respectively. Port voltages Va, Vc, Vb, Vd are input/output voltages (input voltages or output voltages) of the first input/output port 60a, the second input/output port 60c, the third input/output port 60b, and the fourth input/output port 60d, respectively. Port currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer).

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper arm V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60*a*, 60*c*, 60*b*, 60*d* converges to a target value Yo set in the port. For example, the target value Yo is a command value set by the control unit 50 or a predetermined apparatus other than the control unit 50 on the basis of driving conditions defined in relation to the respective loads (the primary side low voltage system load 61*c* and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as a power transmission amount. For example, the target transmitted power Po is a command value set by the control unit 50 or a predetermined apparatus other than the control unit 50 on the basis of a deviation between the detected value Yd and the target value Yo in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60*a*, 60*c*, 60*b*, 60*d* of the power supply circuit 10. Two control variables, namely a phase difference $\phi$ and a duty ratio D (an ON time $\delta$) are used as the main control parameters X.

The phase difference $\phi$ is a deviation (a time lag) between switching timings of identical-phase power conversion circuit units of the primary side full bridge circuit 200 and the secondary side full bridge circuit 300. The duty ratio D (the ON time $\delta$) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference $\phi$ and the duty ratio D (the ON time $\delta$).

Figure 2:
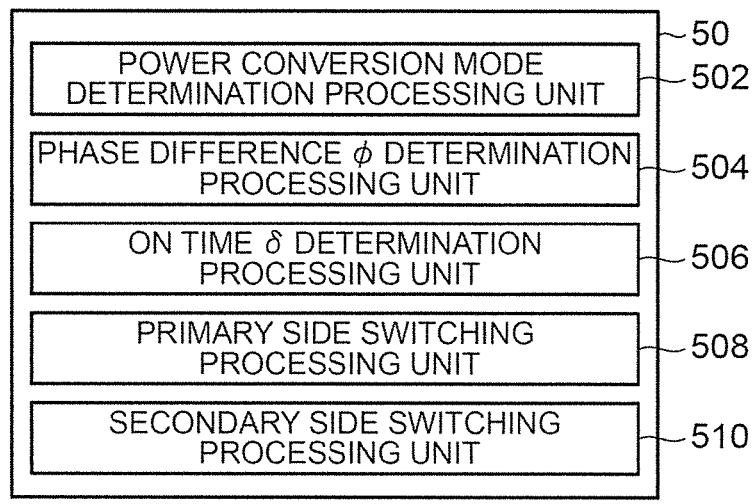
FIG. 2 is a block diagram showing an example of a configuration of a control unit according to this embodiment.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference $\phi$ determination processing unit 504, an ON time $\delta$ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60*a* is converted and output to the second input/output port 60*c*. In mode B, power input from the first input/output port 60*a* is converted and output to the third input/output port 60*b*. In mode C, power input from the first input/output port 60*a* is converted and output to the fourth input/output port 60*d*.

In mode D, power input from the second input/output port 60*c* is converted and output to the first input/output port 60*a*. In mode E, power input from the second input/output port 60*c* is converted and output to the third input/output port 60*b*. In mode F, power input from the second input/output port 60*c* is converted and output to the fourth input/output port 60*d*.

In mode G, power input from the third input/output port 60*b* is converted and output to the first input/output port 60*a*. In mode H, power input from the third input/output port 60*b* is converted and output to the second input/output port 60*c*. In mode L, power input from the third input/output port 60*b* is converted and output to the fourth input/output port 60*d*.

In mode J, power input from the fourth input/output port 60*d* is converted and output to the first input/output port 60*a*. In mode K, power input from the fourth input/output port 60*d* is converted and output to the second input/output port 60*c*. In mode L, power input from the fourth input/output port 60*d* is converted and output to the third input/output port 60*b*.

The phase difference $\phi$ determination processing unit 504 has a function for setting a phase difference $\phi$ between switching period motions of the switching elements between the primary side conversion circuit 20 and the secondary side conversion circuit 30 in order to cause the power supply circuit 10 to function as a direct current-direct current (DC-DC) converter circuit.

The ON time $\delta$ determination processing unit 506 has a function for setting an ON time $\delta$ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference φ determination processing unit 504, and the ON time δ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference φ determination processing unit 504, and the ON time δ determination processing unit 506.

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient kT, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
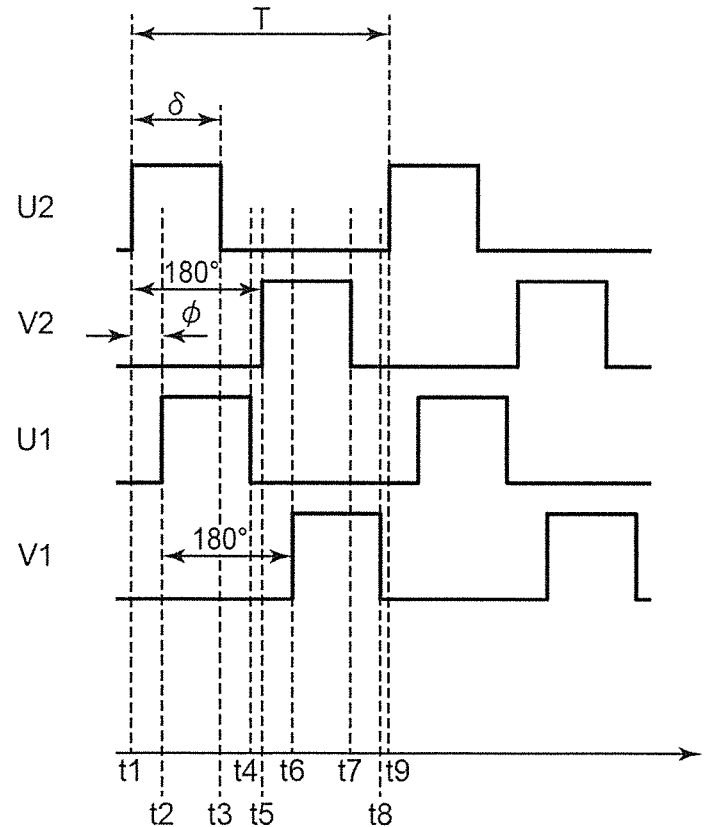
FIG. 3 is a timing chart showing an example of switching operations of a primary side circuit and a secondary side circuit according to this embodiment.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ11=secondary side ON time δ12=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20 = the voltage of the second input/output port 60c/the voltage of the first input/output port $60a = \delta 11/T = \alpha/T$, and the step-up/step-down ratio of the secondary side conversion circuit 30 = the voltage of the fourth input/output port 60d/the voltage of the third input/output port $60b = \delta 12/T = \alpha/T$.

In other words, the respective step-up/step-down ratios of the primary side conversion circuit 20 and the secondary side conversion circuit 30 take identical values (=α/T).

Note that the ON time δ in FIG. 3 represents both the ON time δ11 of the primary side first upper arm U11 and the primary side second upper arm V1 and the ON time δ12 of the secondary side first upper arm U2 and the secondary side second upper arm V2. Further, the switching period T of the arms constituting the primary side full bridge circuit 200 and the switching period T of the arms constituting the secondary side full bridge circuit 300 are equal times.

Furthermore, a phase difference between U1 and V1 is activated at 180 degrees (π), and a phase difference between U2 and V2 is likewise activated at 180 degrees (π). Moreover, by changing the phase difference φ between U1 and U2, the power transmission amount P between the primary side conversion circuit 20 and the secondary side conversion circuit 30 can be adjusted such that when the phase difference φ>0, power can be transmitted from the primary side conversion circuit 20 to the secondary side conversion circuit 30, and when the phase difference φ<0, power can be transmitted from the secondary side conversion circuit 30 to the primary side conversion circuit 20.

The phase difference φ is a deviation (a time lag) between the switching timings of identical-phase power conversion circuit units of the primary side full bridge circuit 200 and the secondary side full bridge circuit 300. For example, the phase difference φ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference φ between U1 and U2 and the phase difference φ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time δ determination processing unit 506 then sets the ON time δ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time δ set by the ON time δ determination processing unit 506, and outputs the stepped-down voltage to the fourth input/output port 60d. Further, the phase difference φ determination processing unit 504 sets the phase difference φ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference φ is power transmitted from one of the primary side conversion circuit 20 and the secondary side conversion circuit 30 to the other via the transformer 400, and is expressed as $$P=(N \times Va \times Vb)/(\pi \times \omega \times L) \times F(D,\phi)$$  Equation 1

Note that N is a winding ratio of the transformer 400, Va is the input/output voltage of the first input/output port 60a, Vb is the input/output voltage of the third input/output port 60b, π is pi, ω(=2π×f=2π/T) is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, φ) is a function having the duty ratio D and the phase difference φ as variables and a variable that increases monotonically as the phase difference φ increases, independently of the duty ratio D. The duty ratio D and the phase difference φ are control parameters designed to vary within a range sandwiched between predetermined upper and lower limit values.

Figure 4:
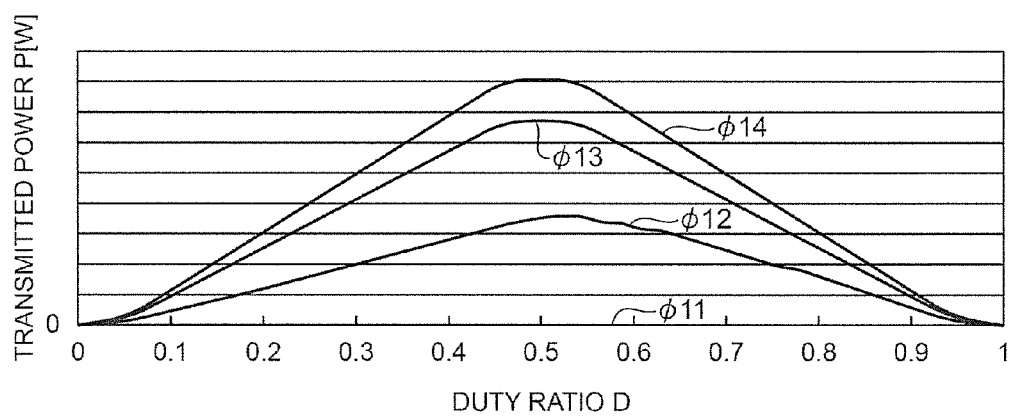
FIG. 4 is a graph showing relations between transmitted power P and a phase difference $\phi$ and a duty ratio D according to the embodiment.

The transmitted power P is adjusted by the control unit 50 changing the phase difference φ but is affected by the duty ratio D as shown in Equation 1 and FIG. 4. FIG. 4 is a graph showing relations between the transmitted power P and the phase difference φ and the duty ratio D. The transmitted power P increases consistently with phase difference φ(φ11<φ12<φ13<φ14). However, even when the phase difference φ is fixed to the same value, the transmitted power P decreases with the increasing duty ratio D if the duty ratio D is larger than 0.5, and decreases consistently with the duty ratio D if the duty ratio D is smaller than 0.5.

Thus, even when changing a command value φo for the phase difference φ so that the transmitted power P converges to the target transmitted power Po, the control unit 50 may fail to accurately adjust the transmitted power P to the target transmitted power Po depending on a command value Do for the duty ratio D. Similarly, even when changing the command value φo for the phase difference φ so that the I/O value Y for a predetermined I/O port converges to the target value Yo, the control unit 50 may fail to accurately adjust the I/O value Y to the target value Yo depending on a command value Do for the duty ratio D. If the transmitted power P or the I/O value Y fails to be accurately adjusted, the control of the transmitted power P or the I/O value Y is likely to oscillate.

Such an oscillation phenomenon is likely to occur, for example, when a difference equal to or larger than a predetermined value is present between a port voltage and a target voltage if the power consumption of any of the loads connected to the I/O ports changes rapidly or if the power supply circuit 10 is activated. This is because, when a difference equal to or larger than the predetermined value is present between the port voltage and the target voltage, the control unit 50 changes the phase difference φ and the duty ratio D at the same time, causing a change in the phase difference φ to be hindered by a change in duty ratio D.

Thus, the control unit 50 has suppression means for suppressing a fluctuation in the transmitted power P by suppressing a change in the duty ratio D. Thus, the adjustment of the transmitted power P is unlikely to be affected by the duty ratio D, allowing the transmitted power P to be accurately adjusted. The control unit 50, for example, suppresses the change in the duty ratio D when the phase difference φ is changed so that the change in the duty ratio D is unlikely to affect the change in the phase difference φ. The control unit 50 can thus smoothly change the phase difference φ. As a result, the transmitted power P can be adjusted to a desired value with a fluctuation in the transmitted power P being suppressed. This allows the port voltage to converge smoothly to the target voltage.

Figure 5:
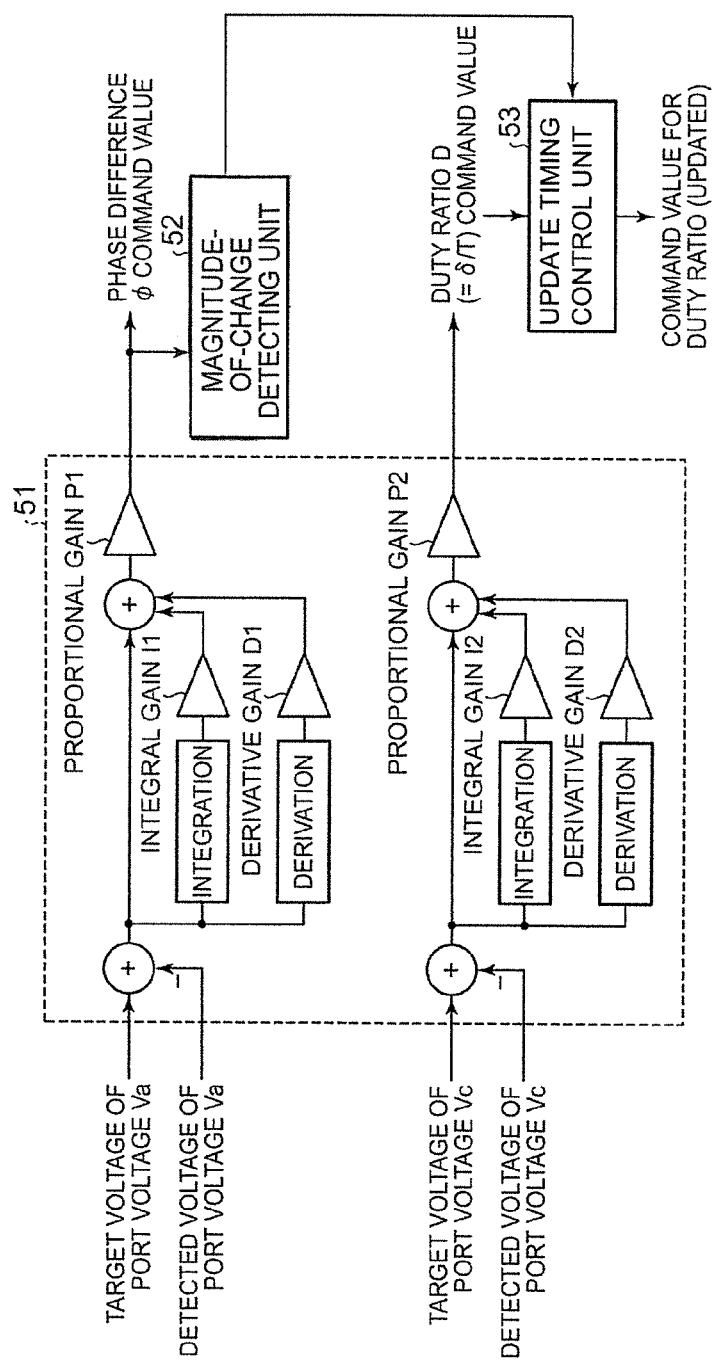
FIG. 5 is a block diagram showing a configuration example of a control unit according to the embodiment.

Thus, FIG. 5 is a block diagram showing a first configuration example of the control unit 50. The control unit 50 has a PID control unit 51, a magnitude-of-change detecting unit 52, and an update timing control unit 53.

The PID control unit 51 has a phase difference command value generating unit that performs PID control to generate, for every switching period T, the command value φo for the phase difference φ intended to cause the port voltage of at least one of the primary and secondary side ports to converge to the target value. For example, the phase difference command value generating unit of the PID control unit 51 performs PID control based on a deviation between the target voltage for a port voltage Va and the detected voltage of the port voltage Va acquired by a sensor unit 70, to generate the command value φo for causing the deviation to converge to zero, for every switching period T.

The control unit 50 performs switching control on the primary side conversion circuit 20 and the secondary side conversion circuit 30 in accordance with the command value φo generated by the PID control unit 51 to adjust the transmitted power P defined by Equation 1 so that the port voltage converges to the target voltage.

Furthermore, the PID control unit 51 has a duty ratio command value generating unit that performs PID control to generate, for every switching period T, the command value Do for the duty ratio D intended to cause the port voltage of at least one of the primary and secondary side ports to converge to the target value. For example, the duty ratio command value generating unit of the PID control unit 51 performs PID control based on a deviation between the target voltage for a port voltage Vc and the detected voltage of the port voltage Vc acquired by the sensor unit 70, to generate the command value Do for causing the deviation to converge to zero, for every switching period T.

Note that the PID control unit 51 may include an ON time command value generation unit that generates a command value δo of the ON time δ instead of the command value Do of the duty ratio D.

The magnitude-of-change detecting unit 52 is means for detecting the magnitude of change (the amount of change) in the phase difference φ obtained when the phase difference φ is changed from an unchanged value to a changed value. The magnitude of change in the phase difference φ refers to a value representing the difference between the unchanged value of the phase difference φ and the changed value of the phase difference φ. The magnitude-of-change detecting unit 52, for example, detects the magnitude of change in the command value φo for the phase difference φ generated for every switching period T by the PID control unit 51, as the actual magnitude of change in the phase difference φ.

The update timing control unit 53 is means for delaying an update timing for the command value Do for the duty ratio D generated by the PID control unit 51 until the next or subsequent switching period T in accordance with the magnitude of change in the phase difference φ detected by the magnitude-of-change detecting unit 52. The update timing control unit 53 can delay a change timing for the actual duty ratio D by delaying the update timing for the command value Do. This enables a change in the duty ratio D to be suppressed.

For example, when the magnitude of change in the phase difference φ is equal to or larger than a predetermined value Z, the update timing control unit 53 suppresses the change in the duty ratio D by delaying the timing at which the command value Do for the duty ratio D is updated, to thereby reduce the frequency of updates of the command value Do for the duty ratio D. The update timing control unit 53, for example, sets the command value Do specifying the duty ratio D for the current switching period T to an old command value for the duty ratio D generated during a switching period T before the last switching period T rather than to the latest command value Do for the duty ratio D generated during the current switching period T.

On the other hand, for example, when the magnitude of change in the phase difference φ is smaller than the predetermined value Z, the update timing control unit 53 does not delay the update timing for the command value Do for the duty ratio D so as not to suppress the change the duty ratio D (when the change in the duty ratio D has been suppressed, the suppression is cancelled). The update timing control unit 53, for example, sets the command value Do specifying the duty ratio D for the current switching period T to the latest command value for the duty ratio D generated during the current switching period T. This sets the frequency of updates of the command value Do for the duty ratio D to a normal value.

The control unit 50 performs switching control on the primary side conversion circuit 20 and the secondary side conversion circuit 30 in accordance with the command value Do set by the update timing control unit 53, to adjust the step-up/step-down ratio of the primary side conversion circuit 20 to the secondary side conversion circuit 30 so that the port voltage converges to the target voltage.

Figure 6:
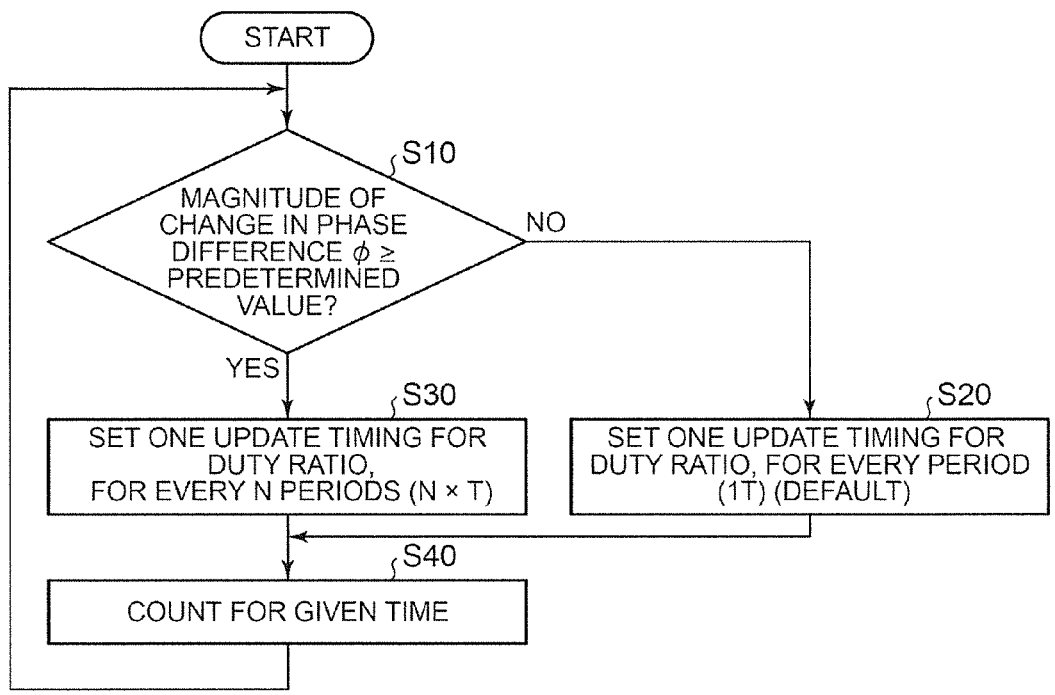
FIG. 6 is a flowchart showing an example of a power conversion method according to the invention.

FIG. 6 is a flowchart showing an example of a power conversion method. The power conversion method shown in FIG. 6 is executed by the control unit 50.

In step S10, the update timing control unit 53 determines whether or not the magnitude of change in the phase difference $\phi$ detected by the magnitude-of-change detecting unit 52 is equal to or larger than the predetermined value Z. Determining whether or not the magnitude of change in the phase difference $\phi$ is equal to or larger than the predetermined value Z enables determination of whether or not the command value $\phi$o is about to oscillate. The update timing control unit 53 performs processing in step S30 when the magnitude of change in the phase difference $\phi$ is equal to or larger than the predetermined value Z, and performs processing in step S20 when the magnitude of change in the phase difference $\phi$ is smaller than the predetermined value Z.

Figure 7:
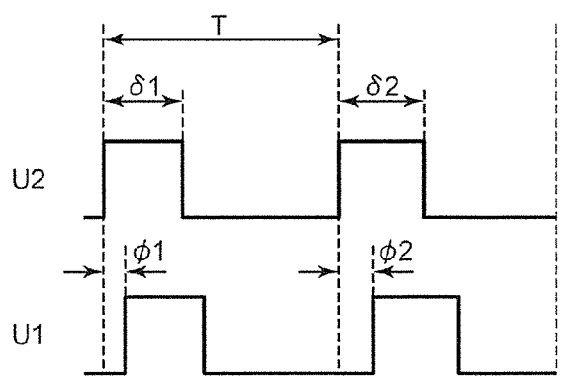
FIG. 7 is a timing chart of one update of the duty ratio D (on time $\delta$) for every switching period.

In step S20, the update timing control unit 53 sets one update timing for the command value Do for the duty ratio D (the command value $\delta$o for the on time $\delta$), for one switching period (1T) (see FIG. 7).

FIG. 7 is a timing chart showing that one update timing for the duty ratio D (=$\delta$/T) is set for every switching period (1T).

The control unit 50 changes the phase difference $\phi$ for every switching period. The control unit 50 sets the phase difference $\phi$ for the ith, current switching period T to a phase difference $\phi$1 generated during the ith, current switching period T, and sets the phase difference $\phi$ for the i+1th, next switching period T to a phase difference $\phi$2 generated during the i+1th, next switching period T. Thus, the control unit 50 increases the phase difference $\phi$ in order for every switching period ($\phi$1<$\phi$2). In this case, a natural number is denoted by i.

On the other hand, the control unit 50 also changes the duty ratio D (on time $\delta$) for every switching period. The control unit 50 sets the duty ratio D (on time $\delta$) for the ith, current switching period T to a duty ratio D1 (on time $\delta$1) generated during the ith, current switching period T, and sets the duty ratio D (on time $\delta$) for the i+1$^{th}$, next switching period T to a duty ratio D2 (on time $\delta$2) generated during the i+1$^{th}$, next switching period T.

Figure 8:
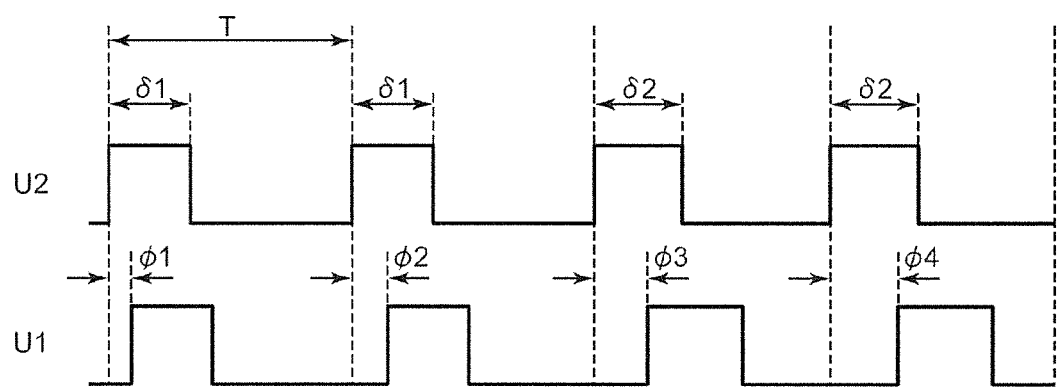
FIG. 8 is a timing chart of one update of the duty ratio D (on time $\delta$) for every two switching periods.

On the other hand, in step S30 in FIG. 6, the update timing control unit 53 sets one update timing for the command value Do for the duty ratio D (the command value $\delta$o for the on time $\delta$), for every N switching periods (N×T) (see FIG. 8). In this case, a natural number is denoted by N.

FIG. 8 is a timing chart showing that one update timing for the duty ratio D (=$\delta$/T) is set for two switching periods (2T). That is, FIG. 8 shows a case of N=2.

As in the case of FIG. 7, the control unit 50 changes the phase difference $\phi$ for every switching period. The control unit 50 increases the phase difference $\phi$ in order for every switching period ($\phi$1<$\phi$2<$\phi$3<$\phi$4).

On the other hand, the control unit 50 changes the duty ratio D (on time $\delta$) for every two switching periods. The control unit 50 sets the duty ratio D (on time $\delta$) for the ith switching period T to the duty ratio D1 (on time $\delta$1) generated during the ith switching period T, and sets the duty ratio D (on time $\delta$) for the i+1$^{th}$ switching period T to the duty ratio D1 (on time $\delta$1) generated during the ith switching period T. The control unit 50 sets the duty ratio D (on time $\delta$) for the i+3$^{th}$ switching period T to the duty ratio D2 (on time $\delta$2) generated during the i+3$^{th}$ switching period T, and sets the duty ratio D (on time $\delta$) for the i+4$^{th}$ switching period T to the duty ratio D2 (on time $\delta$2) generated during the i+3$^{th}$ switching period T.

Thus, the control unit 50 forcibly sets the duty ratio D (on time $\delta$) to the same value over a plurality of consecutive switching periods T to suppress a change in the duty ratio D even in a situation where the duty ratio D changes.

In step S40 in FIG. 6, the control unit 50 performs processing in step S20 or S30 for a predetermined time (at least a time equal to or longer than "N×T") and then repeats the processing in step S10 and the subsequent steps.

FIGS. 7 and 8 show an example in which the phase difference $\phi$ and the duty ratio D gradually increase. However, the above description also applies to a case where the phase difference $\phi$ and the duty ratio D gradually decrease.

Figure 9:
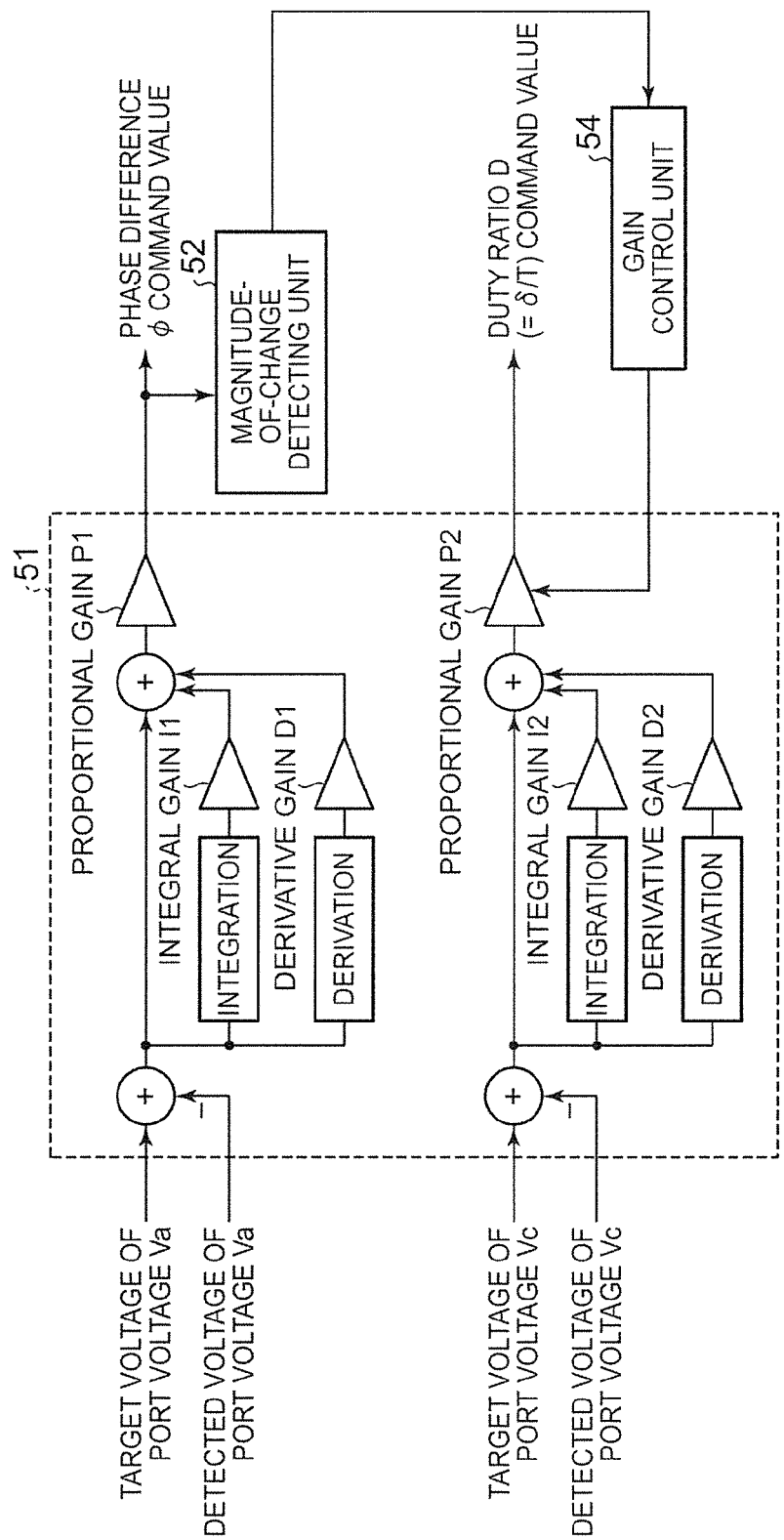
FIG. 9 is a block diagram showing a configuration example of a control unit according to the embodiment.

FIG. 9 is a block diagram showing a second configuration example of the control unit 50. The control unit 50 has the PID control unit 51, the magnitude-of-change detecting unit 52, and a gain control unit 54. Description is omitted which relates to a part of the configuration of the control unit 50 which is similar to the corresponding part of the above-described configuration example.

The gain control unit 54 is means for adjusting an amplification factor (gain) for a predetermined input value input to the PID control unit 51 in accordance with the magnitude of change in the phase difference $\phi$ detected by the magnitude-of-change detecting unit 52, enabling suppression of the rate of change R in the command value Do for the duty ratio D with respect to the input value. The gain control unit 54 can suppress the rate of change R in the command value Do to suppress the rate of change in the actual duty ratio D. The rate of change R is an indicator indicating at what rate the duty ratio D has changed with respect to the amount of change in the input value.

The predetermined input value input to the PID control unit 51 is, for example, a deviation between the port voltage of at least one of the primary and secondary side ports and the target voltage. As a specific example, FIG. 9 shows a deviation between the target voltage for the port voltage Vc and the detected voltage of the port voltage Vc acquired by the sensor unit 70. Furthermore, FIG. 9 illustrates, as the predetermined amplification factor (gain), a proportional gain P2 that is a constant determining a proportional operation of the PID control unit 51.

The control unit 50 performs switching control on the primary side conversion circuit 20 and the secondary side conversion circuit 30 in accordance with the command value Do set based on the proportional gain P2 suppressed by the gain control unit 54, to adjust the step-up/step-down ratio of the primary side conversion circuit 20 to the secondary side conversion circuit 30 so that the port voltage converges to the target voltage.

Figure 10:
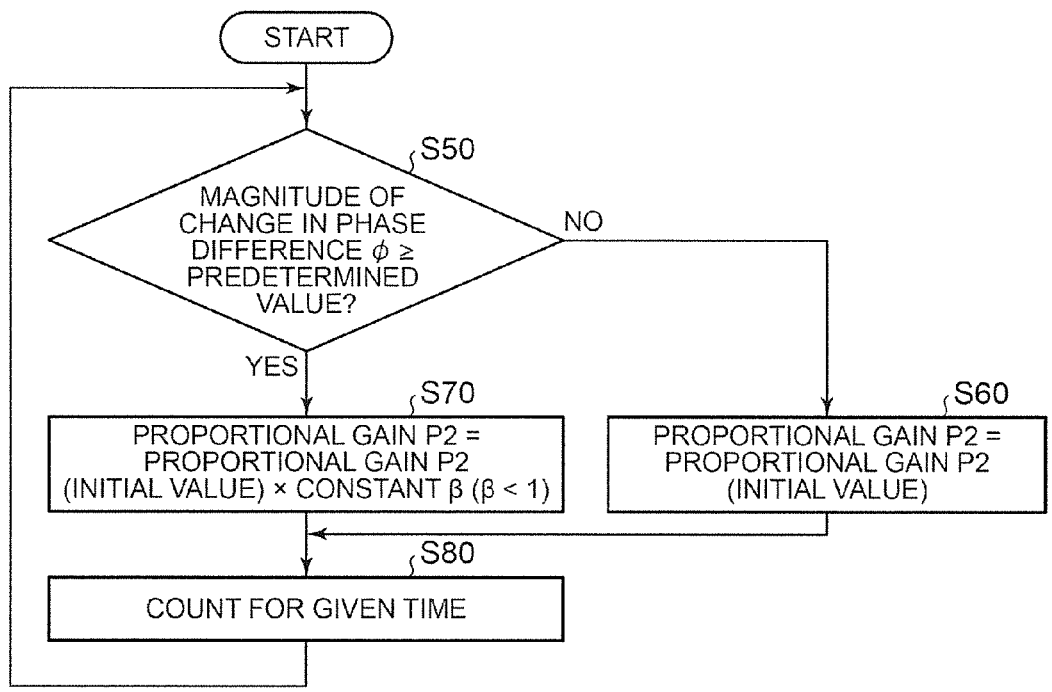
FIG. 10 is a flowchart showing an example of a power conversion method according to the invention.

FIG. 10 is a flowchart showing a second example of the power conversion method. The power conversion method in FIG. 10 is executed by the control unit 50.

In step S50, the gain control unit 54 determines whether or not the magnitude of change in the phase difference $\phi$ detected by the magnitude-of-change detecting unit 52 is equal to or larger than the predetermined value Z. Determining whether or not the magnitude of change in the command value $\phi$o for the phase difference $\phi$ is equal to or larger than the predetermined value Z enables determination of whether or not the command value $\phi$o is about to oscillate. The gain control unit 54 performs processing in step S70 when the magnitude of change in the phase difference $\phi$ is equal to or larger than the predetermined value Z, and performs processing in step S60 when the magnitude of change in the phase difference ϕ is smaller than the predetermined value Z.

In step S60, the gain control unit 54 sets the proportional gain P2 to a normal value (for example, an initial value). In this case, a change in the duty ratio D is not suppressed.

On the other hand, in step S70, the gain control unit 54 sets the proportional gain P2 to the normal value (for example, the initial value)×a constant β. The constant β is a value smaller than 1. Thus, the proportional gain P2 can be made smaller than the normal value, allowing a change in the duty ratio D to be suppressed.

In step 80, the control unit 50 performs the processing in step S60 or S70 for a predetermined time and then repeats the processing in step S50 and the subsequent steps.

An embodiment of the power conversion apparatus and power conversion method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

Furthermore, by suppressing a change in the command value ϕo for the phase difference ϕ, the control unit 50 may suppress a fluctuation in the transmitted power P, adjusted by changing the duty ratio D. For example, the control unit 50 delays the timing at which the command value ϕo for the phase difference ϕ is updated to reduce the frequency of updates of the command value ϕo, thus suppressing a change in the phase difference ϕ.

What is claimed is:

1. A power conversion apparatus comprising:
   a transformer comprising a primary side coil and a secondary side coil;
   a primary side full bridge circuit comprising a primary side first arm circuit including a primary side first upper arm and a primary side first lower arm connected in series, and a primary side second arm circuit including a primary side second upper arm and a primary side second lower arm connected in series, wherein the primary side coil is included in a first bridge part that connects a first midpoint between the primary side first upper arm and the primary side first lower arm and a second midpoint between the primary side second upper arm and the primary side second lower arm;
   a secondary side full bridge circuit comprising a secondary side first arm circuit including a secondary side first upper arm and a secondary side first lower arm connected in series, and a secondary side second arm circuit including a secondary side second upper arm and a secondary side second lower arm connected in series, wherein the secondary side coil is included in a second bridge part that connects a third midpoint between the secondary side first upper arm and the secondary side first lower arm and a fourth midpoint between the secondary side second upper arm and the secondary side second lower arm; and
   a control unit configured to adjust transmitted power transmitted between the primary side full bridge circuit and the secondary side full bridge circuit by changing a phase difference between switching of the primary side full bridge circuit and switching of the secondary side full bridge circuit,
   wherein the control unit suppresses a fluctuation in the transmitted power by suppressing a change in a duty ratio of the switching of the primary side full bridge circuit to the switching of the secondary side full bridge circuit in accordance with a magnitude of change in the phase difference when the magnitude of change is equal to or larger than a predetermined value.

2. The power conversion apparatus according to claim 1, wherein the control unit suppresses the change in the duty ratio when the phase difference is changed.

3. The power conversion apparatus according to claim 1, wherein the control unit cancels the suppression of the change in the duty ratio when the magnitude of change is smaller than the predetermined value.

4. The power conversion apparatus according to claim 1, wherein the control unit reduces a frequency at which the duty ratio changes.

5. The power conversion apparatus according to claim 1, wherein the control unit delays a timing at which the duty ratio changes.

6. The power conversion apparatus according to claim 1, wherein the control unit consecutively sets the duty ratio to an identical value.

7. The power conversion apparatus according to claim 1, wherein the control unit adjusts an amplification factor for a predetermined input value to suppress a rate of change of the duty ratio with respect to the input value.

8. A power conversion method for adjusting transmitted power transmitted between a primary side full bridge circuit and a secondary side full bridge circuit magnetically coupled to the primary side full bridge circuit through a transformer, by changing a phase difference between switching of the primary side full bridge circuit and switching of the secondary side full bridge circuit, the method comprising:
   suppressing a fluctuation in the transmitted power by suppressing a change in a duty ratio of the switching of the primary side full bridge circuit to the switching of the secondary side full bridge circuit in accordance with a magnitude of change in the phase difference when the magnitude of change is equal to or larger than a predetermined value.

9. A power conversion apparatus comprising:
   a transformer comprising a primary side coil and a secondary side coil;
   a primary side full bridge circuit comprising a primary side first arm circuit including a primary side first upper arm and a primary side first lower arm connected in series, and a primary side second arm circuit including a primary side second upper arm and a primary side second lower arm connected in series, wherein the primary side coil is included in a first bridge part that connects a first midpoint between the primary side first upper arm and the primary side first lower arm and a second midpoint between the primary side second upper arm and the primary side second lower arm;
   a secondary side full bridge circuit comprising a secondary side first arm circuit including a secondary side first upper arm and a secondary side first lower arm connected in series, and a secondary side second arm circuit including a secondary side second upper arm and a secondary side second lower arm connected in series, wherein the secondary side coil is included in a second bridge part that connects a third midpoint between the secondary side first upper arm and the secondary side first lower arm and a fourth midpoint between the secondary side second upper arm and the secondary side second lower arm; and a control unit that: (i) changes a phase difference between switching in the primary side first upper arm and switching in the secondary side first upper arm; (ii) changes an update timing of a duty ratio of the secondary side first upper arm based on a magnitude of a change in the phase difference between switching in the primary side first upper arm and switching in the secondary side first upper arm; (iii) determines whether the magnitude of the change in the phase difference is equal to or larger than a predetermined value; and (iv) changes the update timing of the duty ratio of the secondary side first upper arm in response to determining that the magnitude of change in the phase difference is equal to or larger than the predetermined value.

10. The power conversion apparatus of claim 9, wherein the change in the update timing reduces a frequency of changing the duty ratio of the secondary side first upper arm.

11. The power conversion apparatus of claim 9, wherein the change in the update timing delays a change in the duty ratio of the secondary side first upper arm.

\* \* \* \* \*

UNITED STATES PATENT AND TRADEMARK OFFICE
CERTIFICATE OF CORRECTION

PATENT NO. : 9,853,557 B2
APPLICATION NO. : 14/282441
DATED : December 26, 2017
INVENTOR(S) : Takahiro Hirano It is certified that error appears in the above-identified patent and that said Letters Patent is hereby corrected as shown below:

In the Specification

In Column 4, Line 30, delete "/V1 1" and insert --/V1-- therefor.

In Column 8, Line 41, delete "mode L" and insert --mode I-- therefor.

Signed and Sealed this
Twenty-second Day of May, 2018

Andrei Iancu
*Director of the United States Patent and Trademark Office*